United States Patent [19]

Wechsler

[11] 4,390,822
[45] Jun. 28, 1983

[54] RATIO CONTROL SYSTEM

[76] Inventor: Bernard Wechsler, 2831 E. White Star Ave., Ste. "D", Anaheim, Calif. 92806

[21] Appl. No.: 288,681

[22] Filed: Jul. 31, 1981

[51] Int. Cl.³ .............................................. H02P 7/74
[52] U.S. Cl. ..................................... 318/114; 366/76; 323/255
[58] Field of Search .................. 318/98, 99, 100, 111, 318/45, 46, 47, 114, 124; 323/255, 256, 257, 340, 341; 366/76; 336/150

[56] References Cited

U.S. PATENT DOCUMENTS

| | | | |
|---|---|---|---|
| 1,695,886 | 12/1978 | Dann et al. | 323/256 |
| 3,182,969 | 5/1965 | Rupp | 366/76 |
| 4,330,818 | 5/1982 | Peschel | 323/340 |

*Primary Examiner*—J. V. Truhe
*Assistant Examiner*—A. Evans
*Attorney, Agent, or Firm*—Paul H. Ware

[57] ABSTRACT

Apparatus for continuously feeding selected ratios of materials to be mixed together. Accurate proportioning of the component materials is facilitated through the advantages of the invention. Since all ingredients are introduced continuously in the selected ratios, overrun problems are resolved and the exact amount of the mix required can be produced. Dry particulate materials in granular, pellet or powdered form and also liquid components of a mixture are contemplated by the invention. Thus the inventive device accomplishes the precise control of the blending of dry granular, slurry and liquid components on a continuous feed basis. The invention achieves this result through the maintenance of precise voltage ratios rather than voltage levels. Applicability is to vibrators delivering dry materials, augers delivering dry and/or slurry materials and also to pumps delivering liquid materials.

4 Claims, 1 Drawing Figure

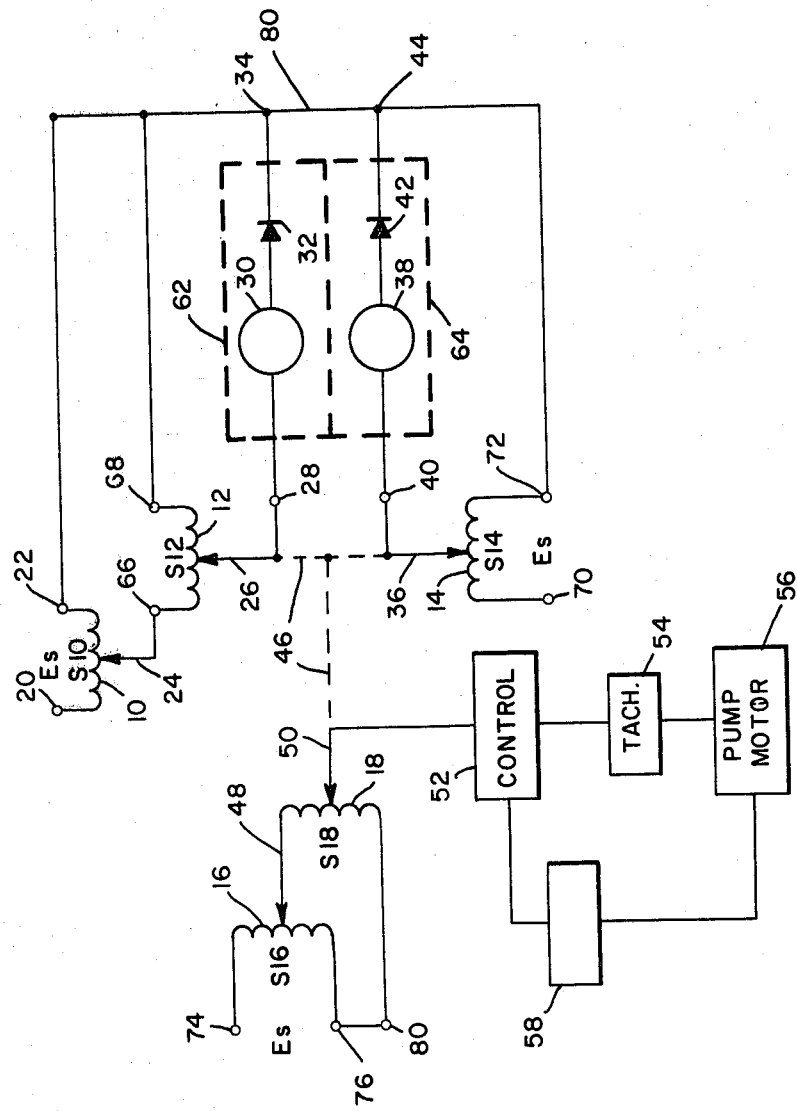

RATIO CONTROL SYSTEM

BACKGROUND OF THE INVENTION

1. Field of the Invention

This invention relates generally to mixing and measuring apparatus and more particularly to an improved control system and apparatus for mixing a plurality of dry, granular, slurry and/or powdered materials being fed into a blender on a continuous basis by maintaining precise control over the ratios of feed rates. An extension of the basic invention permits the added advantage of mixing liquid materials.

2. Description of the Prior Art

Mixing and measuring apparatus are known in which a plurality of granular materials in a predetermined proportion purportedly can be mixed, however, much difficulty has been encountered in accurately proportioning the mix components. Much has depended on the skill of the individual craftsman in operating the various devices claiming the ability to blend disparate materials.

In the plastics industry, virgin plastic, in pellet form, with color dye in pellet or powder form, is blended on a continuous basis. A number of schemes have been used, however, the problems encountered are typical of problems encountered in other applications as well.

Color concentrate may be fed in both the pellet and powder form. Powder is usually used in applications in which the end product is one color and one color only. In this application, the whole facility becomes the color of the powder dye.

In pelletized dye applications, the dye concentrate must usually be prepared, as for example, a small amount of plastic is introduced into the dye and the mixture is then extruded. The extruded product is then chopped up to form the pellets. The color is re-released when the plastic material is further processed, for example, by melting down and running through the auger of an extruding machine. It is easier to change colors of the end product when the pellet-dye process is used since the whole facility does not take on the color of a dye.

Some of the prior art problems have been attacked through the device of feeding a colorant into an auger type extrusion machine at a predetermined rate. A vibrator is commonly used to control the rate of colorant fed, for example, three unit weights of colorant per eighty-five unit weights of raw plastic pellets. Thus the ratio 3/85 is set up in the units noted.

The vibrator, mentioned above, is used in many applications in conjunction with a tray or trough and a control for controlling the speed of vibration. Remaining with the plastics example for the moment, most extrusion machines of the auger type are rated with respect to the amount of material delivered by the auger to an extrusion head per unit time. Colorant may be fed into the auger at a convenient location at a rate determined by the speed of vibration of the colorant-feeding vibrating tray. In our numerical example above, it is necessary to set our rate of vibration of the colorant-feeding vibrating tray so that it will supply three eighty-fifths (3/85) of the amount of colorant with respect to the rated operating capacity of the auger machine.

Typically, the feed rates of the color and of the virgin plastic are controlled by rheostats connected in series with their respective vibrators. Materials are thus taken from bins and fed into a blender mechanism. Adjustment of the rheostat controls the A.C. voltage applied to the vibrator; thus, the rate of feed of materials is controlled. Each vibrator, however, has its own internal impedance which, in operation, must be added to the resistance of the rheostat thus making the control non-linear. Because of this inherent non-linearity, mechanical ganging of the rheostats is of no practical value. Gross errors thus result in attempting to set the virgin plastic-to-color material ratios.

The feed of the virgin plastic, as described above, is effected in general by means of a rheostat-controlled vibrator, while the feed of the color material may be controlled by means of an auger driven by a D.C. motor. It has been observed that though the control by means of a rheostat of a vibrator is non-linear, the control of a D.C. auger drive approaches linearity fairly closely. Slightly better control of the color feed rate to match the virgin plastic feed rate may thus be realized. A great disadvantage encountered, however, is the fact that there are two independent controls with which an operator must work thus making the system heavily dependent upon the skill and experience of the operator in matching the flow rates.

The use of A.C. regulated power supplies offers a practical alternative to the use of rheostats as described above. However, in order to obtain a linear vibrator output with respect to applied voltage, it is necessary to generate a smooth sinusoidal wave-form. Difficulties in generating and maintaining a smooth sine wave of voltage under load conditions are well known. Again, it is impractical to gang controls together.

Another interesting device blends a precise amount of one material to a measured batch of another material. This batch process is in general use in the plastics industry and in other industries in which precision control of the individual components of a mix is required. Typically, in the batch process, individual components of the mix are fed sequentially into the weighing hopper of a scale. When the desired weight of one component has been loaded onto the weighing hopper, the feeding operation is interrupted and the next mix component is then loaded into the weighing hopper until the scale indicates that the proper weight has been added. This process is repeated until all of the mix components have been added to the weighing hopper in their respective required amounts as indicated by the weighing scale. After all of the components of the mix have been loaded into the weighing hopper, the contents of the weighing hopper are introduced into a blending drum where the mix is tumbled until the mixing process is deemed complete.

It is obvious that a method of this type inherits all the disadvantages of the batch type mixing, for example, dependence on the skill of the operator, precise timing required, tolerances, overruns, etc. The process is inherently slow, requiring as it does, that each component be weighed out meticulously and sequentially. After the weighing process, the batch is usually dropped by gravity feed into a baffled mixing drun where it is blended, generally by means of rotation. It is not generally practical to carry out the blending operation simultaneously with the weighing step since vibrations fed into the system by the rotating blending drum disturb the accuracy of the weighing scale.

Another disadvantage of the batch system involves the actual mixing. Since the mixing is done empirically, there is no certain way by which it may be known just how uniform and homogeneous a mixture has become after being resident in the mixing drum for this empirical time interval. Components making up a relatively small amount of the total mix may tumble about in little wads of concentration and never truly blend uniformly with the balance of the mix. Thoroughness of blending is thus also a multi-variable function of mixing drum design, speed of rotation or agitation, total number of cycles of rotation or agitation, nature of the materials being blended, etc.

One of the most troublesome disadvantages is one involving tolerances. Trace quantities in particular, pose a serious problem for the batch process. Weighing scales typically have an accuracy of ±0.1% of full scale reading. For purposes of illustration, assume a total batch weight of ⅔ of scale capacity. Assume further a trace element of 1% of the weight of the batch. The error inherent in the batch system in metering this small quantity is ±15%. If an error of this magnitude cannot be tolerated, an independent and more precise scale system must be utilized in addition to the original weighing system.

Another troublesome area is called out by the term "overruns". In the batch method of mixing, a predetermined amount of the mixture must be produced. For example, if 1.5 batches are required, two batches must be mixed and the surplus either stored, discarded, or disposed of in some way. The point is, 1.5 batches cannot be produced ab initio by the batch method.

One method of feeding a dry particulate material to be mixed from a bin is to use a vibrating tray as has been noted. It can be shown that the amount of material fed is directly proportional to the voltage applied to the vibrator. Stated in the succinct symbolism of mathematics, we have:

$$M = K \times V$$

where:
M is the amount of material fed;
K is a proportionality constant;
V is the applied voltage.

Almost all vibrator systems of the kind considered here incorporate some form of rectifying device applying alternating electric energy to a solenoid coil so that on the half cycle that the vibrator solenoid coil is energized, the vibrator tray is pushed forward by the solenoid. On the half cycle that it is deenergized, a spring snaps the tray back thus leaving the materials advanced on the tray. Vibrating systems are well known in many arts and their application, for example, to the plastics industry has been indicated.

Many different mixing and measuring devices have been employed in the attempts to solve the problems presented. Most have either presented new problems or only partially solved the problems presented or both. Most of these devices have thus met special needs as presented by specific problems and have, therefore, served narrow purposes. These prior art devices, among other disadvantages, have caused unacceptable amounts of one particulate material to be mixed with another as a result of tolerance buildup in the measuring method employed. A number of these prior art devices have been unreliable and unpredictable in operation under continued use and have been expensive and complicated to manufacture and maintain. Some of these prior art devices have been described in the following listed patents that were brought to the attention of the applicant through a novelty search conducted in the U.S. Patent and Trademark Office.

| PATENT NO. | TITLE | INVENTOR |
|---|---|---|
| 3,154,808 | Continuous Internal Stiff-Gel Mixer | Ahlefeld et al |
| 3,182,969 | Blending Apparatus | Rupp |
| 3,228,065 | Device for Feeding Raw Material to Plastic Extrusion Machines | Cournoyer et al |
| 3,231,243 | Apparatus for Blending Bulk Raw Materials with Colorant | Armstrong |
| 4,021,022 | Pigment Metering and Mixing Apparatus | Satterfield et al |

While reference patents have been drawn very heavily from the plastics industry, obvious application is immediately apparent in other disciplines, for example, food mixing, animal feed preparation especially with respect to vitamin and hormone addition.

It would thus be a great advantage to the art to provide for the mixing of materials in preselected ratios.

A further great advantage would be to provide for repeatability in the selection of given ratios among materials to be mixed.

A still further advantage would be to provide for improved mixing means so as to control the quantity of a mix so provided thus preventing overruns.

Yet another advantage would be to provide an apparatus in which the accuracies of the ratios of the materials to be mixed would be independent of operator skill.

An additional advantage would be the provision of an apparatus for mixing materials in which the requirement for precise timing is eliminated.

A further great advantage would be to provide a system accomplishing the other above-noted advantages that is simple and easy to operate and economical to manufacture, install and maintain.

SUMMARY OF THE INVENTION

It is an object of the present invention to provide for the mixing of materials in preselected ratios.

A further object of the invention is to provide for repeatability in the selections of given ratios among materials to be mixed.

A still further object of the present invention is to provide for improved mixing means so as to control the quantity of a mix so provided thus preventing overruns.

Yet another object of the present invention is to provide an apparatus in which the accuracies of the ratios of materials to be mixed is independent of operator skill.

An additional object of the present invention is the provision of an apparatus for mixing materials in which the requirement for precise timing is eliminated.

A further object of the present invention is the accomplishment of the above-stated objects among others in a system that is simple and easy to operate and economical to manufacture, install and maintain.

In the accomplishment of these and other objects, a ratio control system is provided in which all components of a mixture are introduced continuously in the proper ratios. It is a feature of the invention that trace quantities can be added with the same accuracy and precision as bulk quantities. The inventive system here contemplated is simple and economical to initiate and also to maintain since there are no solid state electronics or digital subsystems included. In operation, the system can produce the exact amount of a mixture required thus solving the problem of overruns that plagues the prior art "batch" systems.

It is well recognized that the least expensive method of feeding granular materials from a bin is through the use of vibrating trays. It can be shown that the amount of material fed is directly proportional to the voltage applied to the vibrator. We thus may write the mathematical relationship:

$$M = K \times V$$

where:
M is the amount of material fed;
K is a proportionality constant;
V is an applied voltage,
as before.

On the half cycle that the vibrator coil is energized, the tray is pushed forward by the solenoid action; on the half cycle that the coil is de-energized, a spring action snaps the tray back such that particles are advanced on the tray. Ignoring second-order current flow effects, linear control over the applied coil voltage is obtained through the use of autotransformers. The direct-supply autotransformers, furnishing operating voltages directly to the vibrators, operate on a common shaft with one of them receiving full supply voltage. The other direct-supply autotransformer has its voltage supply adjusted through a ratio autotransformer. The ratio autotransformer is so called here because it can vary the voltage supply to the direct-supply autotransformer as will become clearer in the further explanations following.

In practice, the ratio autotransformer can be secured inside a locked cabinet to prevent tampering and unauthorized adjustment. Thus responsible personnel can establish a desired ratio and depend on its not being disturbed by other operators. The system can be readily expanded to multiple mix additives and to liquid components of a mixture as will be shown.

BRIEF DESCRIPTION OF THE DRAWING

FIG. 1 is a schematic diagram showing the electrical connections and components in schematic symbolism.

DETAILED DESCRIPTION

Although specific embodiment of the invention will now be described with reference to the drawing, it should be understood that such embodiments are by way of example only and merely illustrative of but a small number of the many possible specific embodiments which can represent applications of the principles of the invention. Various changes and modifications, obvious to one skilled in the art to which the invention pertains, are deemed to be within the spirit, scope and contemplation of the invention as further defined in the appended claims.

Referring to FIG. 1 with greater particularity, a ratio autotransformer 10 has primary supply voltage $E_s$ supplied to its terminals 20 and 22. A fraction of primary supply voltage $E_s$ is applied to a first terminal 66 of supply autotransformer 12 by means of wiper arm 24 of ratio autotransformer 10. A second terminal 68 of supply autotransformer 12 is connected to common terminal 80 as is also terminal 22 of ratio autotransformer 10. A fraction of the voltage supplied to supply autotransformer 12 is in turn supplied by means of its wiper arm 26 to a first vibrator system 62 by means of its first external terminal 28. Vibrating systems of the type utilized by the present invention are well known in the art. An explanation of typical operation would add nothing to the store of knowledge and hence will not be undertaken. Suffice it to say that in the two vibrating systems shown, 62 and 64, the important major components are the solenoid coil systems and requisite connections denoted here by the numerals 30 and 38 respectively, and the systems effecting rectification of supplied alternating voltages, these rectifiers being symbolized by diodes 32 and 42 respectively. The second external terminal 34 of first vibrator system 62 is connected to common terminal 80.

Primary supply voltage $E_s$ is also supplied to a second supply autotransformer 14 at its terminals 70 and 72; terminal 72 being connected to common terminal 80. A fraction of supply voltage $E_s$ is then applied to a first external terminal 40 of a second vibrator system 64 by means of its wiper arm 36. The second external terminal 44 is in turn connected to common terminal 80. The wiper arms 26 and 36 of supply autotransformers 12 and 14 respectively are mechanically connected by means of adjustable insulated mechanical common shaft 46. It is thus readily apparent that a fraction of supply voltage $E_s$ may be applied to second vibrator 64 by means of its wiper arm 36. It will become apparent that we can now set up a ratio of applied voltages to be supplied to vibrator systems 62 and 64. For ease of manipulation, let us assume that the settings of ratio autotransformer 10 and supply autotransformer 14 are equal. Let us further symbolize these settings by means of a capital S and the numerals, the same as the identification numerals of the autotransformers. Thus, $S_{14}$ will symbolize the setting of wiper arm 36 with respect to supply autotransformer 14; $S_{10}$ will symbolize the setting of wiper arm 24 with respect to ratio autotransformer 10 and so on.

By our assumption of the equality of the settings of autotransformers 10 and 14, we have:

$$S_{10} = S_{14} \tag{1}$$

so that the voltage applied to vibrator system 64 may be symbolized as:

$$E_s/S_{14} = E_s/S_{10}. \tag{2}$$

Now the voltage applied to vibrator system 62 is a fraction of that voltage applied to supply autotransformers 12. We may symbolize this voltage as:

$$\frac{\frac{E_s}{S_{10}}}{S_{12}} = \frac{E_s}{S_{10} \times S_{12}} \tag{3}$$

A further excursion into symbolism will allow us to denote the fraction $E_s/S_{10}$ as $V_1$, and since by our initial assumptions that $S_{10}$ equals $S_{14}$ and thus $E_s/S_{14} = E_s/S_{10}$, we have $$M_1 = K \times V_1 \tag{4}$$

$M_1$ will thus be the amount of material supplied by vibrator system 64 when energized by voltage $V_1$.

Since from our equation (3), the voltage applied to vibrator system 62 has been symbolized as $$\frac{E_s/S_{10}}{S_{12}}$$

we may write this as $V_1/S_{12}$, showing this voltage as a fraction of $V_1$ by the denominator factor $S_{12}$. Thus the voltage applied to vibrator system 62 is symbolized as $$V_2 = V_1/S_{12} \tag{5}$$

clearly a fraction of $V_1$, determined by the setting of autotransformer 12. More explicitly, the setting of autotransformer 12 may be expressed as a ratio of the voltages $V_1$ and $V_2$ as $$S_{12} = V_1/V_2 \tag{6}$$

The expression $M_2 = K \times V_2$ then gives the amount of material that will be supplied by vibrating system 62 when energized by voltage $V_2$.

It follows easily that $$\frac{M_1}{M_2} = \frac{K \times V_1}{K \times V_2} \tag{7}$$

Since the proportionality constants K may be considered to be equal for the same model of autotransformer, we then have, $$M_1/M_2 = V_1/V_2 \tag{8}$$

and since the voltages applied are within our control, thus also are the amounts of material supplied by each vibrator. Expansion of the system to more than two vibrator systems is immediately obvious. It is also evident that even assuming the inequality of the settings of $S_{10}$ and $S_{14}$ for the derived voltage $$E_s/S_{14} = E_s/S_{10},$$

there nevertheless exist two numbers X and Y such that $$X \frac{E_s}{S_{14}} = Y \frac{E_s}{S_{10}} \tag{9}$$

so that immediately, $$\frac{E_s}{S_{14}} = Y/X \frac{E_s}{S_{10}}. \tag{10}$$

Here $E_s/S_{14}$ is the voltage $V_1$ applied to vibrator system 64. The voltage applied to vibrator system 62 may be derived as:

$$V_2 = \frac{E_s}{S_{10} \times S_{12}}$$

and substituting from equation (8) for $E_s/S_{10}$ we have:

$$V_2 = X/Y \left(\frac{E_s}{S_{14}}\right) \times \frac{1}{S_{12}}. \tag{11}$$

Thus $V_2$ is a function of empirically determined numbers X and Y and the settings of supply autotransformers 12 and 14.

The problem of adding liquid components to a mix may be solved by adding another ratio system of autotransformers and applying a controlled voltage to a direct current pump motor as shown. Ratio autotransformer 16 has primary supply voltage $E_s$ applied to its terminals 74 and 76. Terminal 76 is also connected to common terminal 80. A fraction of primary supply voltage $E_s$ is in turn applied to supply autotransformer 18 by means of the setting $S_{16}$ of wiper arm 48 of ratio autotransformer 16. The setting $S_{18}$ of the wiper arm 50 of the supply autotransformer 18 is also effected by the adjustable insulated mechanical common shaft 46. This voltage is then applied to a motor speed control system 60, types of which are well known in the art. Systems used to control motor speed, and thus the output of a pump operated by such a motor, commonly employ a controller, here denoted by the numeral 52, a tachometer 54, the pump motor itself 56 and a servo feedback line having a transfer function denoted by the box 58. Controlling the speed of the pump controls in turn the amount of liquid material that will be delivered at the output of the pump and thus to the mixture contemplated.

Thus there has been described a ratio control system that will greatly improve the mixing of dry particulate materials and also liquid materials, either with each other only or with both kinds of materials together thus providing for blending multiple, disparate components. Great improvements in reliability, repeatability flexibility, maintainability, ease of operation, economy and accuracy in providing components to a mix have been provided through the novel advantages of the invention.

It is here pointed out that although the present invention has been shown and described with reference to particular embodiment, nevertheless various changes and modifications, obvious to one skilled in the art to which the invention pertains, are deemed to lie within the purview of the invention.

What is claimed and desired to be secured by Letters Patent of the United States is:

1. Apparatus for continuously feeding materials to be mixed together in ratios comprising:
   means for providing ratios of electrical voltages, said means comprising:
      at least one first ratio autotransformer having input terminals and a wiper arm having an output terminal and responsive to a supply voltage;
      at least one first supply autotransformer having input terminals and a wiper arm having an output terminal and said at least one first supply autotransformer responsive to output voltage from said at least one ratio autotransformer;
      at least one second supply autotransformer having input terminals and a wiper arm having an output terminal and said at least one second supply autotransformer responsive to said a supply voltage;
      means for actuating the wiper arm of said at least one first supply autotransformer in relation to the wiper arm of said at least one second supply autotransformer;
   means responsive to said means for providing ratios of electrical voltages for feeding selected ratios of materials to be mixed together, said responsive means comprising:
      at least one first vibrator system having external terminals to receive electrical input from said means for providing ratios of electrical voltages;
      mechanical means to provide vibrations in response to electrical input received by means of said external terminals;
      rectifying means to rectify the electrical input received by means of said external terminals;

at least one second vibrator system having external terminals to receive electrical input from said means for providing ratios of electrical voltages;

mechanical means to provide vibrations in response to electrical input received by means of said external terminals; and rectifying means to rectify the electrical input received by means of said external terminals.

2. Apparatus for continuously feeding materials to be mixed together in selected ratios comprising:

means for providing ratios of electrical voltages, said means comprising:

at least one first ratio autotransformer having input terminals and a wiper arm having an output terminal and responsive to a supply voltage;

at least one first supply autotransformer having input terminals and a wiper arm having an output terminal and at least one first supply autotransformer responsive to output voltage from said at least one first ratio autotransformer;

at least one second supply autotransformer having input terminals and a wiper arm having an output terminal and said at least one second supply autotransformer responsive to said a supply voltage;

means for actuating the wiper arm of said at least one first supply autotransformer in relation to the wiper arm of said at least one second supply autotransformer;

means responsive to said means for providing ratios of electrical voltages, for feeding materials to be mixed together comprising:

at least one second ratio autotransformer having input terminals and a wiper arm having an output terminal and responsive to a supply voltage;

at least one third supply autotransformer having input terminals and a wiper arm having an output terminal and said at least one third supply autotransformer responsive to output voltage from said at least one second ratio autotransformer;

a pump motor control system responsive to output voltage from said at least one third supply autotransformer, said pump motor control system comprising:

a pump motor operated from said output voltage from said at least one second supply autotransformer;

a tachometer connected to as to measure the speed of rotation of said pump motor;

a feedback circuit having a transfer function;

a motor speed control mechanism receiving signal input from said tachometer and said feedback circuit so as to control the speed of rotation of said pump motor;

means for actuating the wiper arm of said at least one third supply autotransformer in relation to the wiper arms of said at least one first supply autotransformer and said at least one second supply autotransformer.

3. A system for producing a homogeneous blend of multiple, liquid and dry mix components comprising:

means for producing electrical voltage ratios, said means comprising:

at least one ratio autotransformer responsive to a supply voltage and furnishing its output voltage to a supply autotransformer;

at least one supply autotransformer responsive to voltage output from said ratio autotransformer;

at least one supply autotransformer responsive to a supply voltage;

means for mechanically coupling said at least one supply autotransformer responsive to voltage output from said ratio autotransformer with said at least one autotransformer responsive to a supply voltage;

means responsive to said electrical voltage ratios for feeding both liquid and dry component materials of a mix to a blending environment, said responsive means comprising:

at least one first vibrator system responsive to voltage output from said at least one supply autotransformer responsive to voltage output from said ratio transformer;

at least one second vibrator system responsive to voltage output from said at least one supply autotransformer responsive to a supply voltage; and at least one pump motor system responsive to voltage output from a supply autotransformer itself responsive to voltage output from a ratio autotransformer in turn energized by a supply voltage.

4. A method of providing electrical power in preselected ratios to a plurality of power dispensing systems, which comprises:

connecting at least one ratio autotransformer across first and second terminals of a supply voltage;

connecting a first supply autotransformer between the wiper arm of said at least one ratio autotransformer and the second terminal of said supply voltage;

connecting the wiper arm of said first supply autotransformer to one terminal of a first vibrator system;

connecting the second terminal of said vibrator system to said second terminal of said supply voltage;

connecting a second supply autotransformer across said first and second terminals of said supply voltage;

connecting the wiper arm of said second supply autotransformer to a second vibrator system;

connecting the second terminal of said second vibrator system to said second terminal of said supply voltage;

mechanically connecting the wiper arm of said first supply autotransformer and the wiper arm of said second supply autotransformer together by means of a common insulated shaft;

connecting a second at least one ratio autotransformer across said first and second terminals of said supply voltage;

connecting a third supply autotransformer between the wiper arm of said second ratio autotransformer and said second terminal of said supply voltage;

furnishing the output voltage developed by said third supply autotransformer to an electric motor speed control system; and mechanically connecting the wiper arm of said third supply autotransformer to the common insulated shaft connecting said first supply autotransformer and said second supply autotransformer by means of a common insulated shaft.

* * * * *